United States Patent [19]
Silhouette

[11] Patent Number: 4,462,902
[45] Date of Patent: Jul. 31, 1984

[54] MEANS FOR FILTERING A LIQUID CONTAINING VARIOUS IMPURITIES

[75] Inventor: Jean-Max M. Silhouette, Melun, France

[73] Assignee: S.N.E.C.M.A., Paris, France

[21] Appl. No.: 437,291

[22] Filed: Oct. 28, 1982

[30] Foreign Application Priority Data

Oct. 28, 1981 [FR] France ................ 81 20547

[51] Int. Cl.³ .......................................... B01D 23/24
[52] U.S. Cl. .................. 210/107; 210/404; 210/409; 210/416.4; 210/420; 210/195.1; 210/297
[58] Field of Search .......... 210/90, 91, 101, 102, 210/107, 142, 145, 196, 240, 326, 324, 329, 330, 332, 345, 398, 402, 404, 405, 409, 416.4, 418, 420, 421, 428, 195.1, 297

[56] References Cited

U.S. PATENT DOCUMENTS 2,737,508  3/1956  Axe .................. 260/96.5 C

FOREIGN PATENT DOCUMENTS 339005  12/1917  Fed. Rep. of Germany .
1528213  6/1968  France .
1543530  10/1968 France .
1585649  1/1970  France .
2203663  5/1974  France .
2477029  4/1981  France .

Primary Examiner—Peter A. Hruskoci
Assistant Examiner—Wanda L. Millard
Attorney, Agent, or Firm—Oblon, Fisher, Spivak, McClelland & Maier

[57] ABSTRACT

The invention relates to means for filtering a liquid containing impurities. Said means comprise a filtering drum (9) rotating within a housing (1) and having around it an annular chamber (13) into which opens a conduit (6) for supplying the liquid to be filtered and a conduit (7) for evacuating the liquid leaving the drum and for cleaning the corresponding section. The lateral wall of the drum (9) is equipped with sliding blades (11) which prevent any and all communication between the two conduits (6) and (7). The filtered liquid is evacuated through the lower wall (9d) of the drum (9) through the lower wall (9d) of the drum (9) through an axial opening. The invention applies in particular to the filtration of fuel for aircraft engines.

6 Claims, 4 Drawing Figures

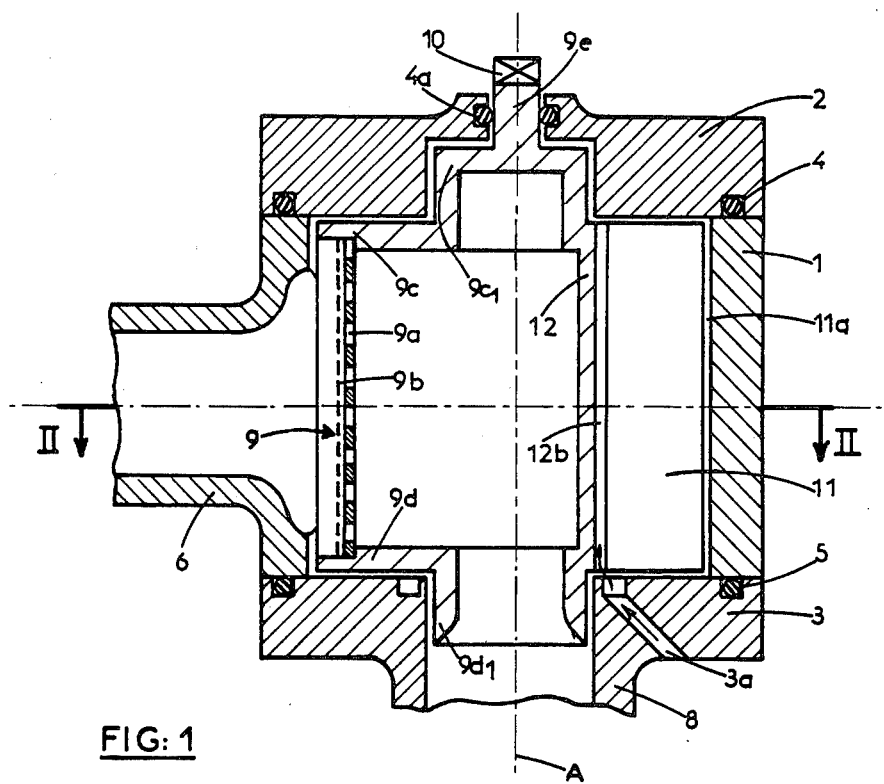
FIG: 1
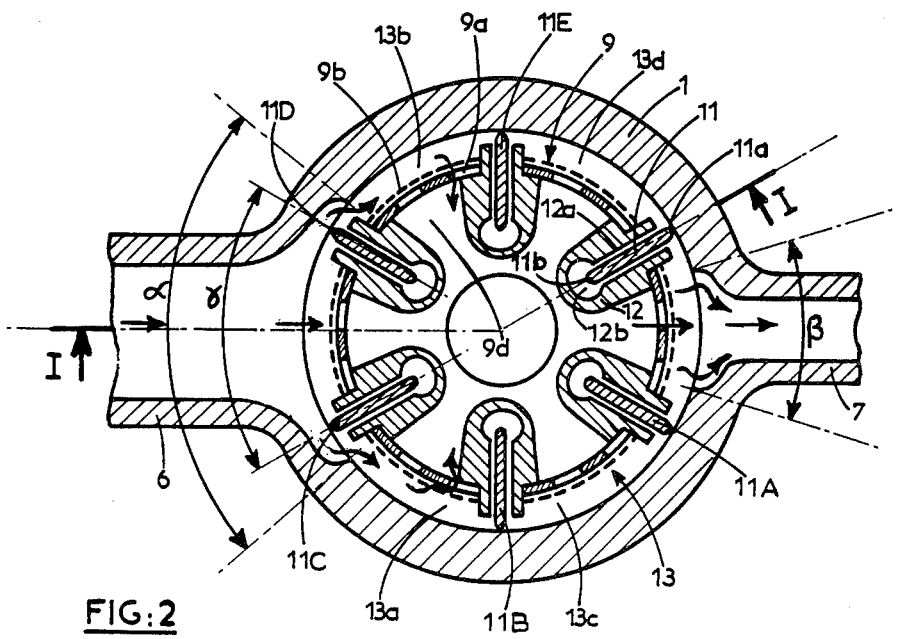
FIG: 2

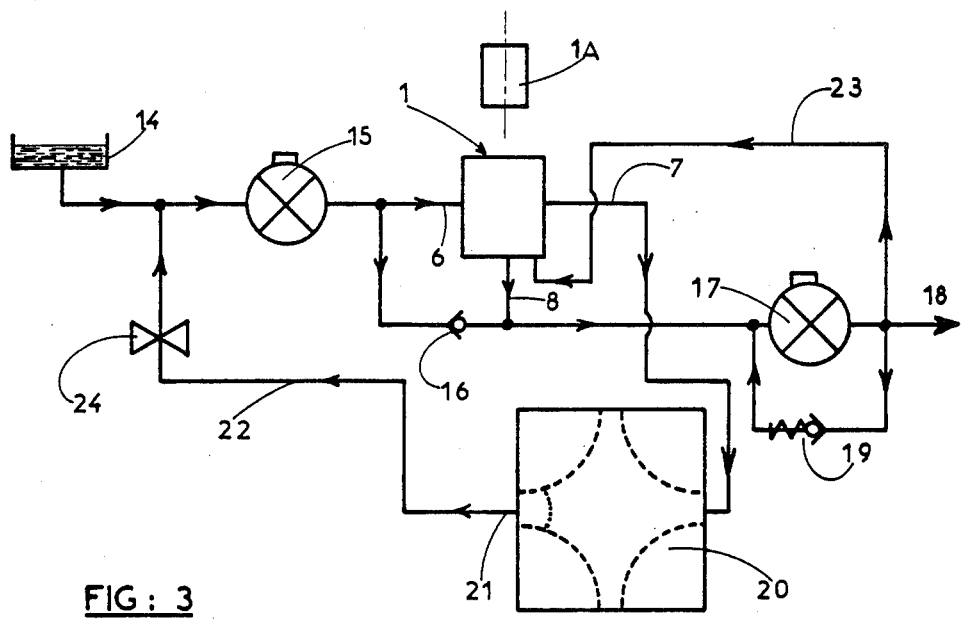
FIG: 3
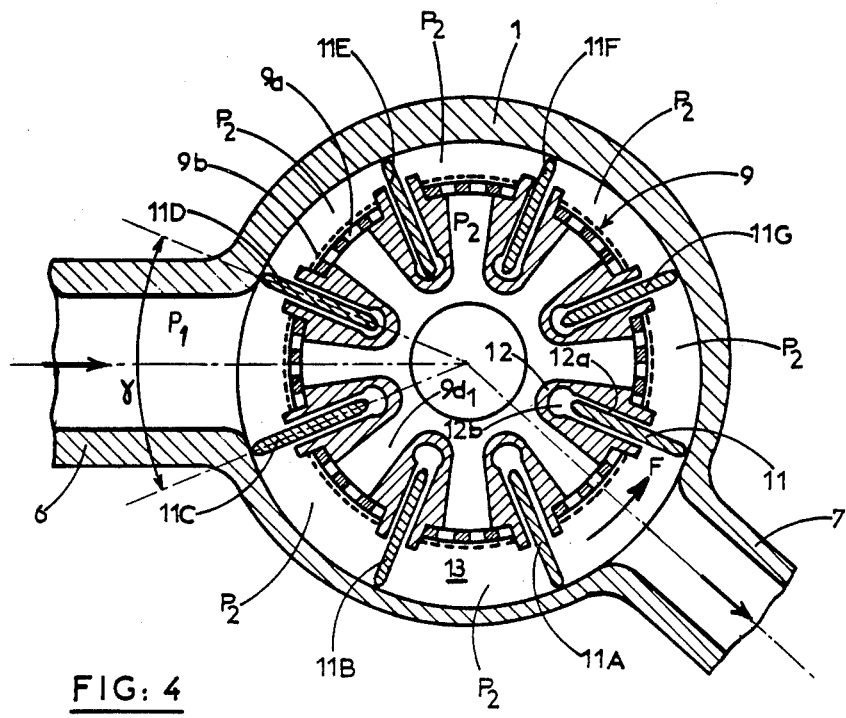
FIG: 4

MEANS FOR FILTERING A LIQUID CONTAINING VARIOUS IMPURITIES

BACKGROUND OF THE INVENTION

1. Field of the Invention

This invention relates to a device for filtering a liquid containing various impurities, and particularly for filtering aircraft engine fuel.

2. Description of the Prior Art

Filters using a rotating drum are already known for such applications.

French Pat. No. 1,543,530 describes a device for filtering a liquid, comprising a filter in the shape of a bell with a perforated lateral wall, driven in slow rotation about its vertical axis, preferably by an hydraulic motor supplied with purified liquid delivered by a pump. The liquid to be filtered enters the rotating bell through the perforations in its lateral wall and, after filtration, is evacuated in an essentially axial direction through the open base of the bell. A vertical distributor is provided to atomize a fraction of the purified liquid supplied by the pump onto a vertical element on the inner surface of the lateral wall of the bell in such a way as to send the impurities deposited on the outer surface of the filter into the mass of contaminated liquid surrounding it. The operation of this filtering device is necessarily relatively unsatisfactory, to the extent that the impurities caught in the filter are sent back into the contaminated liquid, increasing its impurity content, before this contaminated liquid, enriched with additional impurities, passes through the filter. The efficiency of the known filtering device is therefore completely dubious, and in any event it requires frequent cleanings.

French Pat. No. 1,528,213 describes a device for filtering liquids containing various impurities. This device comprises a nozzle which sprays the liquid to be filtered into a fan shape from the bottom upward and against the lateral filtering wall of a drum rotating about its horizontal axis. The filtered liquid is evacuated in an axial direction through one of the bases of the rotating drum. Various elements for cleaning the drum's lateral filtering surface are provided. The cleaning may notably be accomplished by causing a portion of the liquid in the drum to flow back through the lateral filtering wall by means of a low pressure zone created outside the drum by an appropriate efflux joint extending over the entire length of the drum. This arrangement prevents impurities detached from the lateral surface of the drum from being remixed with the liquid to be filtered. However, in the mode of operation of this known device, according to which the filtering drum is driven in continuous rotation, the abovementioned efflux joint covers only a very small and probably insufficient angular width of the lateral wall of the drum. Since the mode of operation of this known filtering device provides for the drum to rotate only at regular intervals and for cleaning phases—during which the filtering operation is suspended—this arrangement is generally not applicable for filtering the fuel supplying an aircraft engine, in that it would entail interruptions in the delivery of fuel which, while brief enough, would increase in frequency depending on the level of impurities in the fuel and which would, at the very least, make ground maintenance requirements more burdensome.

SUMMARY OF THE INVENTION

The device of the invention for filtering a liquid containing various impurities also comprise a drum having a lateral filtering wall mounted in rotation within a stationary housing which surrounds it, while providing for an essentially annular chamber around its lateral wall, with radial blades mounted so as to slide within the lateral wall of said rotating drum so that their outer edges are sealed against the inner wall of the stationary housing in such a way as to define on the lateral wall of the drum at least one active filtering zone through which the liquid to be filtered can enter said drum, and at least one cleaning zone, crossed by a minor fraction of the already filtered liquid, while the majority is evacuated from the drum through an opening in its base. Elements are provided to turn the drum so that the various parts of its lateral wall serve alternately and periodically as filtering and cleaning zones. The device is characterized in that the inner sections of the rotating drum lying respectively in proximity of the filtering and cleaning zones of its lateral wall communicate freely with each other, such that the minor fraction of filtered liquid leaves the drum directly through the cleaning zone of the lateral wall to be evacuated through a corresponding opening in the stationary housing, taking with it the impurities previously deposited in that zone of the lateral wall when it last served as a filtering zone.

The filtration device of the present invention is particularly advantageous in that its operation is entirely satisfactory over a very wide range of impurity levels in the liquid being filtered. This advantageous result is obtained by causing the drum with lateral filtering walls to rotate either continuously at slow speed or intermittently, with, in the first case, the speed of rotations of the drum, and, in the second, the frequency and amplitude of its intermittent rotations being easily adaptable to the impurity level of the liquid to be filtered. Of course, the filtering device of the invention prevents the impurities deposited over a portion of the lateral surface of the drum from being returned to the contaminated liquid, since they are instead driven by a fraction of the previously filtered liquid into a radial evacuation conduit which may open into known means for separating impurities, e.g., a decanter in which the lightest fractions of the fuel are concentrated at the top and the heaviest at the bottom, with the less contaminated fuel then being recycled into the filtering device, e.g., by means of a low pressure pump. In contrast to prior filtration devices mentioned above, the device of the invention has the following advantage: whereas in each of the prior art devices equipped with a rotating drum with a lateral filtering wall only a segment of said filtering wall having a very small angular opening would undergo a cleaning operation at any given time, with the rest of the surface of said filtering wall, i.e., nearly all of it, operating at the same moment as a filter. In the case of the filtration means of the present invention a large but limited portion of the lateral filtering wall of the drum is, at any given time, in the filtering phase, while another portion of said filtering wall, adjacent to the first surface, is simultaneously in the cleaning phase, with the impurities furthermore not being held upstream of the filter. Consequently, any given section of the lateral filtering wall passes successively through filtering and cleaning phases of like duration, eliminating the abovementioned disadvantages of prior filtration means using a rotating drum.

In a particularly advantageous embodiment of the invention, the rotating drum takes the form of a revolving cylinder, while the stationary housing is in the form of a cylinder whose cross-section is matched so as to give the annular chamber an evolutional radial width such that at the pressures applied to the sliding blades at the intake and evacuation conduits respectively, and in the annular chamber, there will correspond a resulting deflecting couple applied to the rotating drum always in the same direction and having an intensity practically independent of the position of the drum, and which will be proportional to the differential pressure between the intake conduit and the axial output conduit. In this embodiment, the motive force necessary for the rotation of the filtering drum is borrowed from the kinetic energy of the liquid to be filtered, thus, ultimately, from the pump which delivers it to the filter. The simplification thus obtained is particularly valuable in the case of filters used to filter fuel for an aircraft engine. Eliminating the necessity of providing an independent motor to drive the filtering drum in rotation furthermore entails a reduction of weight which is particularly valuable in aeronautic filtering equipment.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 1 and 2 represent the first embodiment in respective cross-section along line I—I of FIG. 2 and line II—II of FIG. 1;

FIG. 3 schematically illustrates of filtering equipment equipped with the first embodiment of the invention; and FIG. 4 illustrates schematically the second embodiment in a section analogous to that of FIG. 2.

DETAILED DESCRIPTION OF THE PREFERRED EMBODIMENTS

In FIGS. 1 and 2, reference numeral 1 denotes a housing in the form of a cylinder the two ends of which (upper and lower in FIG. 1) are closed off by annular plates 2 and 3. Toroid gaskets 4 and 5 are inserted between the upper and lower edges of cylindrical housing 1 and corresponding plates 2 and 3 to ensure that the housing assembly will be leakproof. An intake conduit 6 for the liquid to be filtered and a radial evacuation conduit 7 for impurities open into housing 1. In the sample embodiment illustrated, the two conduits 6, 7, which may have circular inner sections, may have their respective horizontal and mutually aligned axes in the horizontal median plane of housing 1. The mouths of conduits 6 and 7 in housing 1 are further flared both in the vertical plane over practically the entire height of housing 1 in order to distribute the liquid to be filtered, in the case of conduit 6 (as seen in FIG. 1), or, in the case of conduit 7, to collect the impurities stopped by the filter, and in the horizontal plane over two angles $\alpha$ and $\beta$, which may be different, as seen in FIG. 2, or equal. Lower plate 3 is further provided with a conduit 8 for evacuation of the filtered liquid, the axis of which may coincide with vertical axis A of cylindrical housing 1.

A cylindrical drum 9 having an exterior diameter which is less than the interior diameter of housing 1 is mounted so as to rotate within housing 1, coaxially with its vertical axis A. In the embodiment shown, the lateral wall of drum 9 consists of an inner strainer 9a having relatively large holes and covered on the outside with a fine filter 9b, e.g., of wire gauze. The lateral filtering wall 9a–9b may be fitted into corresponding recesses provided in two plates 9c and 9d forming the bases of drum 9 and each integral with a journal protruding from drum 9 and coaxial with its axis A. Lower journal $9d_1$ is mounted so as to turn freely within the upper mouthpiece of evacuation conduit 8 which is unitary with lower plate 3. The journal $9d_1$ is itself traversed by a channel connecting the conduit 8 with the inside of rotating drum 9. Upper journal $9c_1$ rotates freely in a cylindrical housing provided in upper plate 2. In addition, in the illustrated embodiment, said upper journal $9c_1$ is provided with an axial extension 9e which passes through an axial hole in plate 2 equipped with a seal 4a so as to allow it to be connected to drive means (not shown) outside plate 2, e.g., by means of a square drive nut 10 forming part of extension 9c.

In accordance with the teachings of the invention, the lateral wall of rotating drum 9 is provided with sliding radial blades 11 of which the outer edges, particularly 11a, are applied in a practically leakproof manner against the inner wall of stationary housing 1. As seen in FIG. 2, blades 11 are slide mounted within wells 12a which are themselves provided within small columns 12 which extend without a break between the two pieces 9c and 9d which form the ends of drum 9. In the preferred embodiment illustrated in the drawing, the arrangement is such that blades 11 are distributed regularly around the circumference of drum 9 so that their respective planes form dihedral angles $\gamma$ which are not too different from angles $\alpha$ and $\beta$. In the example illustrated in FIG. 2, angle $\gamma$ is slightly smaller than previously defined angle $\alpha$ so that the liquid to be filtered, arriving through conduit 6, may pass around the outer edges of blades 11C and 11D and enter annular chambers 13a and 13b, which are defined by the lateral wall of drum 9, by the inner wall of cylindrical housing 1, and by blades 11B and 11C, and 11D and 11E, respectively. On the other hand, the liquid is prevented from circulating within annular chambers 13c and 13d, and particularly from moving toward radial evacuation conduit 7, by sliding blades 11B and 11E, the outer edges of which are tightly applied against the inner wall of stationary housing 1. By contrast, since angle $\gamma$ is slightly greater than the previously defined angle $\beta$, the liquid present in the section of annular chamber lying opposite evacuation conduit 7 can not flow back into the annular chambers 13a and 13b on the left of FIG. 2, nor toward delivery conduit 6, since it is prevented from doing so by sliding blades 11 and 11A. Of course, the relative values of angles $\alpha$, $\beta$, and $\gamma$ are open to options, as are the number of sliding blades 11 and any angle which the axes of conduits 6, 7 may possibly form. Nevertheless, the assembly must be set up so that for any position of drum 9, direct communications between supply conduit 6 and radial evacuation conduit 7 are prohibited by at least some of the sliding blades.

In the illustrated embodiment, the means provided for applying the outer edges of the sliding blades against the inner wall of stationary housing 1 comprise the application upon said blades of forces exerted in the centrifugal direction by a pressurized fluid delivered into chambers 12b, which are formed within small columns 12 by expansions of wells 12a around the inner edges 11b of blades 11. FIG. 1 shows that the pressurized fluid is admitted to chambers 12b through a channel 3a provided in the plate 3 which closes the end of cylindrical housing 1.

In the schematic view of FIG. 3, the set of filtering elements illustrated in FIGS. 1 and 2 is designated by the numeral 1. Numeral 1A designates a motor the shaft of which is coupled to drum 9 (FIG. 1), e.g., by means of square drive nut 10. Numeral 14 designates a tank of the fuel to be filtered and 15 a low pressure pump for delivering it into supply conduit 6 of filtering device 1. A bypass valve 16 is inserted between supply conduit 6 and axial conduit 8 used to evacuate the filtered liquid. The filtered liquid, arriving through conduit 8, is sent by a high pressure pump 17 into an operating circuit 18 (not shown), e.g., the fuel supply circuit of an aircraft engine. A relief valve 19 is also mounted in parallel on pump 17. Lastly, radial evacuation conduit 7 of filtering device 1 is connected to the inlet of a decanter 20, the outlet 21 of which is connected through conduit 22 to the intake of low pressure pump 15. A portion of the highly pressurized liquid delivered by pump 17 is shunted through conduit 23 to channel 3a (FIG. 1) of filtration device 1.

The system illustrated in FIG. 3 operates as follows: With drum 9 in the position illustrated in FIG. 2, it can be seen that the liquid delivered under low pressure into supply conduit 6 is distributed over the entire height of lateral wall 9a-9b of rotating drum 9, and practically over its entire left half (in FIG. 2) so that the liquid passes simultaneously through the three sections of filtering wall contained between sliding blades 11B-11C, 11C-11D, and 11D-11E. Having thus been filtered into drum 9, the liquid is then divided inside the drum into a main fraction which pump 17 sucks through lower tubular bearing $9d_1$ of said drum 9 and axial evacuation conduit 8, with the remaining fraction of the filtered liquid leaving drum 9 through the section of the lateral wall between blades 11 and 11A, entering radial evacuation conduit 7, and ending up in decanter 20. Slight low pressure may be created in the latter by means of a diaphragm 24 placed in output conduit 22 to suck in the liquid in conduit 7. The liquid crossing through the lateral wall of drum 9 between blades 11 and 11A draws with it the impurities which may be soiling this section of the filter. The impurities thus driven off are separated from the liquid in decanter 20 in the form of double inverted volumes, with the fractions lighter than the liquid concentrating toward the top and the heaviest fractions toward the bottom. The thereby less contaminated liquid is then sent back through conduits 21 and 22 toward the intake of low pressure pump 15. An appropriately regulated timer may start motor 1A, which may be an electric motor, when the preceding filtration phase has lasted for a period long enough to permit excessive clogging of the left half of the filtering drum, taking into account the impurity level of the liquid to be filtered and its rate of flow into supply conduit 6. The operating time of motor 1A may be chosen so as to cause drum 9 to turn only by angle $\gamma$, e.g., in a clockwise direction. This motion of drum 9 does not interrupt the process of supplying pump 17 with purified liquid, but merely places opposite the mouth of radial evacuation conduit 7 the section of the filtering drum contained between blades 11E and 11. It is thus this immediately succeeding section of filtering drum 9 that is cleaned in the manner described above during the filtration phase, which again takes place through three of the filtering sections of drum 9, including one new section—that between blades 11A and 11B—which was cleaned in a preceding phase. In this simple example, of course, the duration of each filtration phase, i.e., the time between two successive rotations of drum 9, must be at most one third of the time needed, with all other things being equal, to produce nearly complete clogging of a given section of the filtering drum.

The embodiment described above offers the following additional advantage: since the pressurized fluid used to exert centrifugal force on the sliding blade, e.g., 11, so as to seal their outer edges tightly against the inner wall of stationary housing 11, consists of filtered fuel, it is possible to allow said sliding blades 11 enough clearance within their respective wells 12a for said highly pressurized liquid to be able to escape from chamber 12b (FIG. 2) and circulate within well 12a, lubricating and cleaning the lateral walls of the corresponding blade 11, with said fuel ending up in annular chamber 13 between drum 9 and housing 1, where it is either remixed with the fuel to be filtered, arriving through conduit 6, or with the fuel which has been used to clean a section of the filtering wall of the drum and which will be evacuated through radial conduit 7. FIG. 1 shows further that end plates 9c, 9d of drum 9, as well as journals $9c_1$ and $9d_1$, work in conjunction with the corresponding surfaces of plates 2 and 3 enclosing the ends of housing 1, with enough clearance to allow the highly pressurized filtered fuel arriving through channel 3a to pass through. Portions of this filtered fuel are thus shunted at the outlet of channel 3a to lubricate and clean the rotating parts of drum 9 and the parts of stationary housing 1 with which they cooperate. These additional cleaning and lubricating functions fulfilled by the highly pressurized filtered fuel arriving through channel 3a are extremely valuable when fuel with a high level of impurities must be filtered, in order to be sure of avoiding any risk of the sliding blades becoming blocked in their wells or of the drum seizing up in its bearing. Of course, the tolerances between plate 9c and 2 (and 9d and 3), and between the upper and lower journals and their bearings must be sufficient to permit this lubrication and to provide a barrier against possible impurities, but should not be so excessive as to allow significant leaks or cause a loss of power in the pump.

The embodiment illustrated in FIGS. 1 through 3 and described above is open to numerous variants. The intermittent rotations of drum 9, and particularly the starting and stopping of drive motor 1A, may be controlled by a sensor of the pressure differential between conduit 6 supplying the liquid to be filtered and the axial conduit 8 for evacuating liquid from which impurities have been removed. The gradual clogging of those sections of the filtering drum working in the filtering phase causes this differential pressure to rise gradually. Upon reaching a critical value, this differential may then be sensed so as to trigger the start-up of motor 1A. Of course, the angle of rotation which the motor then imparts to filtering drum 9 can be preset by known means. However, it would also be possible to make the stopping of motor 1A dependent upon the return of the above-mentioned differential pressure to a value sufficiently lower than its critical value, one characteristic of only a partial clogging of the filter. Without departing from the scope of the invention, it would also be possible to have motor 1A impart a continuous rotation to drum 9, slow enough not to disturb the continuity of the filtering and filter cleaning processes. Of course, any pressurized fluid whatsoever could be used to exert the appropriate centrifugal forces upon the sliding blades. However, to the extent that the fluid is not filtered fuel, it would be absolutely necessary for it not to be able to escape from chambers 12b (FIG. 2). In any event, it could not conceivably fulfill the lubricating and cleaning functions indicated above. Motor 1A for driving rotating drum 9 may be of any type: mechanical, electrical, hydraulic, or pneumatic.

In the embodiment illustrated schematically in FIG. 4, rotating drum 9 is still shaped like a cylinder, but stationary housing 1 has a cross-section chosen so as to give annular chamber 13 an evolutional radial width such that at the pressures applied to the sliding blades, e.g., 11, at the supply conduit 6, at radial evacuation conduit 7, and in annular chamber 13, there will result a corresponding deflecting couple Cm applied to rotating drum 9, always in the same direction, and indicated by curved arrow F in FIG. 4. On the other hand, the intensity of this deflecting couple is more or less independent of the position of rotating drum 9 and is proportional to the differential pressure between supply conduit 6 and axial output conduit 8.

As a simple computation will show, and as the applicant has been able to verify experimentally, the deflecting couple applied to drum 9 is proportional to the difference between the pressure $p_1$ in supply conduit 6 and the pressure $p_2$ which reigns not only in annular chamber 13 but also within rotating drum 9 and, consequently, in the axial output conduit of the purified liquid (8 in FIG. 1). When the filtering drum, particularly its fine filter 9b, is perfectly clean, this pressure differential is very low, as is deflecting couple Cm applied to rotating drum 9. The pressure differential $(p_1-p_2)$ and the deflecting couple Cm increase gradually as fine filter 9b becomes clogged with the impurities in the filtered liquid.

In a preferred form of the embodiment illustrated in FIG. 4, means are provided to exert a braking couple on drum 9, proportional preferentially to the pressure differential $(p_1-p_2)$ between intake conduit 6 and the axial evacuation conduit (8 in FIG. 1). It can also be arranged that an essentially constant deflecting couple will be applied to the rotating drum, with this constant couple being capable of being set so as to exactly compensate for the frictional couples to which the rotating drum is submitted. Under these circumstances, the drum may turn at an essentially uniform speed, preferentially rather slowly, so that the various sections of the filtering drum each contained between two sliding blades (e.g., 11) move slowly and successively from filtering position to cleaning position, passing through all intermediate positions.

However, the means for braking rotating drum 9 are preferentially arranged so as to free said drum 9 to rotate only when the pressure differential $(p_1-p_2)$ exceeds a preset threshold. Under these conditions, rotating drum 9 is immobilized for most of the time, until its section then in the filtering phase (the one between blades 11C and 11D in FIG. 4) is sufficiently clogged that the pressure differential $(p_1-p_2)$ exceeds the preset threshold and the deflecting couple Cm proportional to said pressure differential causes drum 9 to rotate, preferentially by an angle $\alpha$, close or equal to the angular interval $\gamma$ between two adjacent sliding blades, as described above with reference to FIGS. 1 and 2.

Of course, the filtration means 7 of FIG. 4 may be incorporated into filtering equipment of the type illustrated in FIG. 3, with independent motor 1A being unnecessary in this case. The motor may also be replaced by a braking device making it possible to obtain the sort of operation described above.

The present invention is not limited to these two embodiments but includes all their variants, particularly that in which the centrifugally applied force necessary to apply the blades against the housing are produced by an elastic system in itself known.

What is claimed as new and desired to be secured by Letters Patent of the United States is:

1. A device for filtering a liquid containing various impurities, said device comprising:
    a stationary housing having an intake conduit opening and an evacuation conduit opening;
    a drum having a base including an opening and having a lateral filtering wall, said drum having radial guides including radially inner chambers, said drum being mounted so as to rotate within said stationary housing which surrounds said drum, said drum and housing providing an essentially annular chamber around a lateral wall of said drum;
    radial blades slide mounted within said guides and extending from said lateral wall of said rotating drum so that inner edges of said blades face said chambers and outer edges of said radial blades are tightly sealed against an inner wall of said stationary housing in such a way as to define on said lateral wall of said drum at least one active filtering zone through which the liquid to be filtered enters said drum, and at least one cleaning zone traversed by a minor fraction of the already filtered liquid while the majority of said liquid is evacuated from said drum through said opening in said drum base;
    means provided to rotate said drum so that various sections of said lateral wall divided by said radial blades serve alternately and periodically as a filtering zone and as a cleaning zone,
    wherein sections of said rotating drum associated with said filtering and cleaning zones of said lateral wall communicate freely with each other, whereby a minor fraction of the filtered liquid leaves said drum directly through said cleaning zone of said lateral wall and is evacuated through said evacuation conduit opening in said stationary housing, said evacuated liquid drawing along with it the impurities previously deposited on said section associated with said cleaning zone; and
    means for exerting a radially outward force on said blades, said means for exerting comprising a high pressure pump delivering filtered fuel to said chambers.

2. The device of claim 1 wherein said radial blades are circumferentially spaced apart at regular angular distances over said lateral wall of said drum.

3. The device of claim 1 or 2 wherein said rotating drum takes the shape of a cylinder, and wherein said stationary housing is in the shape of a cylinder having a section chosen so as to give said annular chamber an evolutional radial width such that at pressures applied to said blades at said intake conduit, at said evacuation conduit, and in said annular chamber result in a corresponding deflecting couple applied to said rotating drum, said couple acting consistently in the same direction and at an intensity that is more or less independent of the position of said drum, said couple being proportional to a differential pressure between said intake conduit and said drum base opening.

4. The device of claim 3 wherein said couple is a braking couple.

5. The device of claim 4 wherein said means for exerting a braking couple on the rotating drum are constructed so as to free said drum to rotate only when said pressure differential exceeds a preset threshold.

6. The device of claim 1 wherein said evacuation conduit communicated with a decanter in which fractions lighter than the fuel concentrate toward the top and heavier fractions toward the bottom, including means for recycling said lighter fractions to said intake conduit opening.

* * * * *